US011971684B2

(12) United States Patent
Akazaki

(10) Patent No.: US 11,971,684 B2
(45) Date of Patent: Apr. 30, 2024

(54) TONER

(71) Applicant: ZEON CORPORATION, Tokyo (JP)

(72) Inventor: Kojiro Akazaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 225 days.

(21) Appl. No.: 17/287,592

(22) PCT Filed: Oct. 21, 2019

(86) PCT No.: PCT/JP2019/041264
§ 371 (c)(1),
(2) Date: Apr. 22, 2021

(87) PCT Pub. No.: WO2020/090537
PCT Pub. Date: May 7, 2020

(65) Prior Publication Data

US 2021/0311406 A1 Oct. 7, 2021

(30) Foreign Application Priority Data

Oct. 31, 2018 (JP) ................................ 2018-204946

(51) Int. Cl.
*G03G 9/087* (2006.01)
*G03G 9/09* (2006.01)
*G03G 9/097* (2006.01)

(52) U.S. Cl.
CPC ..... *G03G 9/08706* (2013.01); *G03G 9/08728* (2013.01); *G03G 9/09* (2013.01); *G03G 9/09741* (2013.01)

(58) Field of Classification Search
None
See application file for complete search history.

(56) References Cited

U.S. PATENT DOCUMENTS 6,040,104 A 3/2000 Nakamura et al.
2009/0186290 A1 7/2009 Yoshizaki et al.
(Continued)

FOREIGN PATENT DOCUMENTS

JP H11-194542 A 7/1999
JP 2007-233016 * 9/2007 ............ G03G 9/087
(Continued)

OTHER PUBLICATIONS

Translation of JP 2007-233016.*
(Continued)

*Primary Examiner* — Peter L Vajda
(74) *Attorney, Agent, or Firm* — WHDA, LLP

(57) ABSTRACT

Provided is toner which has good low-temperature fixability, shelf stability and hot offset resistance, and which suppresses a decrease in glossiness of an image. The toner comprising colored resin particles containing a binder resin, a colorant, a softening agent and a charge control agent, and an external additive, wherein a glass transition temperature (Tg) specified from a temperature dependence curve of a loss tangent (tan δ) obtained by dynamic viscoelastic measurement of the toner, is 50° C. or more and less than 90° C.; the loss tangent (tan δ) at the glass transition temperature (Tg) is 1.70 or less; in a temperature range of 90° C. or more and 160° C. or less, a lowest temperature (Ta) with a loss tangent of 1.50 is more than 95° C. and less than 145° C.; and a storage elastic modulus (G') at the lowest temperature (Ta) is less than 56000 Pa.

4 Claims, 1 Drawing Sheet

(56) References Cited

U.S. PATENT DOCUMENTS

| | | | | |
|---|---|---|---|---|
| 2012/0135344 | A1* | 5/2012 | Wada | G03G 9/08797 430/108.4 |
| 2013/0095423 | A1 | 4/2013 | Takemori | |
| 2014/0205944 | A1 | 7/2014 | Masuda | |
| 2019/0212667 | A1 | 7/2019 | Chiba et al. | |

FOREIGN PATENT DOCUMENTS

| | | | |
|---|---|---|---|
| JP | 2007-233016 | A | 9/2007 |
| JP | 2009-151005 | A | 7/2009 |
| JP | 2012-118271 | A | 6/2012 |
| JP | 2012-133192 | A | 7/2012 |
| JP | 2013-088503 | A | 5/2013 |
| WO | 2009/011424 | A1 | 1/2009 |
| WO | 2013/047296 | A1 | 4/2013 |
| WO | 2018/003749 | A1 | 1/2018 |

OTHER PUBLICATIONS

Notification of Transmittal of Copies of Translation of the International Preliminary Report on Patentability (Form PCT/IB/338) issued in counterpart International Application No. PCT/JP2019/041264 dated May 14, 2021 with Forms PCT/IB/373 and PCT/ISA/237. (11 pages).

* cited by examiner

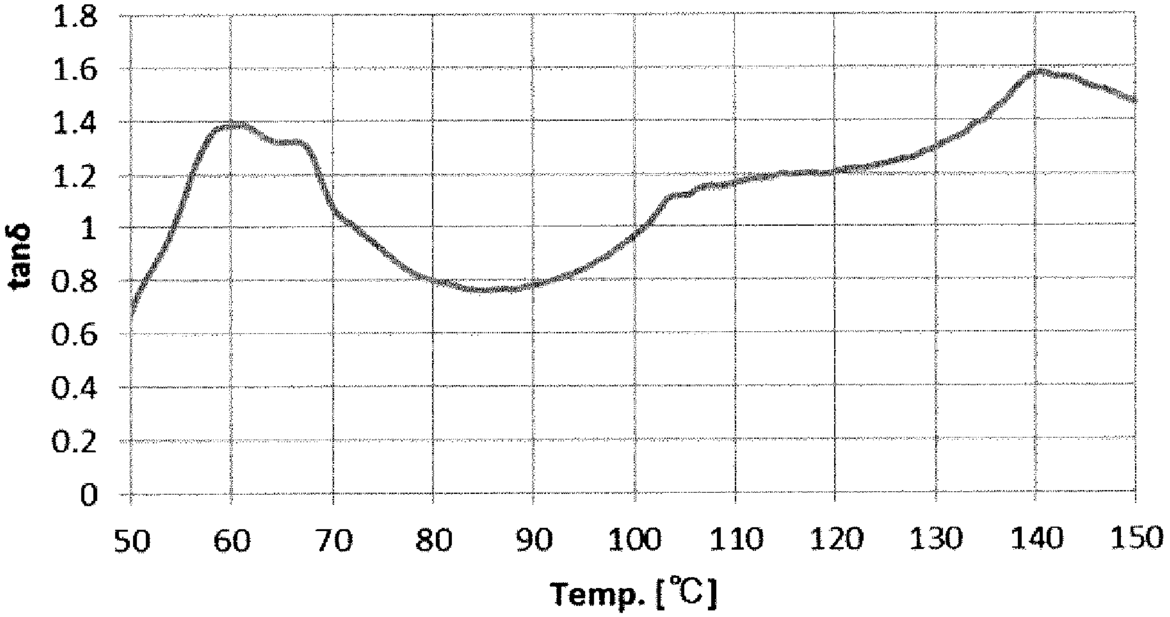
1.8
1.6
1.4
1.2
1
0.8
0.6
0.4
0.2
0
tanδ
50
60
70
80
90
100
110
120
130
140
150
Temp. [℃]

TONER

TECHNICAL FIELD

The present disclosure relates to a toner which is used to develop an electrostatic latent image in, for example, electrophotography, electrostatic recording, and electrostatic printing.

BACKGROUND ART

In an image forming device such as an electronic photographic device, an electrostatic recording device and an electrostatic printing device, first, an electrostatic latent image formed on the photoconductor is developed using a toner; the toner image is transferred onto a transferring material such as a sheet of paper; and the material is heated to fix the image, whereby a fixed image is obtained.

Recently, as such an image forming device, those corresponding to high image quality and high-speed printing are desired. The development of a toner capable of forming a high-quality image, a toner with improved hot offset resistance, and the like has been attempted.

For example, Patent Literature 1 discloses that the following binder resin is used in a toner. The binder resin is a polyester resin, and the minimum tan δ of the binder resin exists between the glass transition temperature (Tg) and the temperature at which the loss elastic modulus (G") becomes $G''=1\times10^4$ Pa. The minimum tan δ of the binder resin is less than 1.2, and the storage elastic modulus (G') at the temperature at which the tan δ is the minimum is $G'=5\times10^5$ Pa or more. The value of tan δ at the temperature at which the loss elastic modulus becomes $G''=1\times10^4$ Pa, is 3.0 or more. In Patent Literature 1, it is described that when the content of the vinyl resin is too large in the binder resin, the hot offset resistance decreases.

Patent Literature 2 discloses an image-forming method in which a specific fixing member and a specific toner are used in combination. The fixing member has a surface layer in which an abrasion-resistant additive having a volume average particle diameter of 1 μm or less is dispersed. The toner has a peak of tan δ in a range of 40° C. to 70° C. in the dynamic viscoelastic temperature-dependent measurement, and the peak value of the tan δ is less than 2.0. In Patent Literature 2, as a method of controlling the peak value to less than 2.0, a method in which an amorphous polyester resin is used as the binder resin of the toner, and fine particles having a particle diameter of 0.1 μm or less are dispersed in the toner, and a method in which a crystalline polyester resin and an amorphous polyester resin are used in combination as the binder resin of the toner, are disclosed.

Patent Literature 3 discloses a toner for developing electrostatic images, the toner containing a binder resin, a colorant, a release agent and a charge control agent. The release agent contains a wax having a polar group; the toner has a tan δ of from 1 to 2 at 80° C. to 145° C., which is measured by a viscoelasticity measuring device at a frequency of 10 kHz and a shear stress of 500 Pa; and the toner has a fracture point of 180° C. or less as observed in the temperature— tan δ curve. In Patent Literature 3, it is described that a polyester resin is preferably used as the binder resin.

CITATION LIST

Patent Literature

Patent Literature 1: Japanese Patent Application Laid-Open (JP-A) No. H11 (1999)-194542
Patent Literature 2: JP-A No. 2009-151005
Patent Literature 3: JP-A No. 2013-88503

SUMMARY OF INVENTION

Technical Problem

However, although the toner disclosed in Patent Literature 1 exhibits blocking resistance and is capable of forming an image with high glossiness, it is insufficient in terms of hot offset resistance, and further improvement is required. In the image forming method disclosed in Patent Literature 2, although the generation of hot offset is suppressed, the blocking of the toner may occur during toner storage, or the glossiness of the image may decrease. Although the toner disclosed in Patent Literature 3 has excellent low-temperature fixability and improved heat resistance, the hot offset resistance of the toner may be insufficient, and the glossiness of the image may decrease.

Thus, it has been difficult to obtain a toner that all of the low-temperature fixability, the shelf stability, and the hot offset resistance of the toner are good, and the glossiness of the image is good.

The present disclosure provides a toner which has good low-temperature fixability, shelf stability and hot offset resistance, and which suppresses a decrease in the glossiness of an image.

Solution to Problem

As a result of an extensive study to achieve the object, the inventor of the present disclosure found the following and achieved the present disclosure: when the composition of the toner is adjusted to satisfy a specific viscoelastic property, blocking during toner storage is suppressed; low temperature fixing is possible; hot offset resistance is excellent; and a decrease in the glossiness of the formed image is suppressed.

The toner of the present disclosure is a toner comprising colored resin particles containing a binder resin, a colorant, a softening agent and a charge control agent, and an external additive, wherein a glass transition temperature (Tg) specified from a temperature dependence curve of a loss tangent (tan δ) obtained by dynamic viscoelastic measurement of the toner, is 50° C. or more and less than 90° C.; the loss tangent (tan δ) at the glass transition temperature (Tg) is 1.70 or less; in a temperature range of 90° C. or more and 160° C. or less, a lowest temperature (Ta) with a loss tangent of 1.50 is more than 95° C. and less than 145° C.; and a storage elastic modulus (G') at the lowest temperature (Ta) is less than 56000 Pa.

In the toner according to the present disclosure, a softening temperature ($T_{1/2}$) measured by a ½ method at a pressure of 5.0 $kgf/cm^2$ using a flow tester, may be more than 110° C. and less than 150° C.

In the toner according to the present disclosure, the charge control agent may contain a functional group-containing copolymer, and an amount of a functional group-containing constitutional unit contained in the functional group-containing copolymer, may be 3% by mass or less.

In the toner according to the present disclosure, the binder resin may be a polymer of one or two or more kinds of polymerizable monomers containing at least one kind of monovinyl monomer selected from the group consisting of styrene, acrylic ester and methacrylic ester.

Advantageous Effects of Invention

According to the present disclosure as described above, a toner which has good low-temperature fixability, shelf stability and hot offset resistance, and which suppresses a decrease in the glossiness of the formed image can be provided.

BRIEF DESCRIPTION OF DRAWINGS

FIG. 1 is a graph showing the temperature dependence curve of the loss tangent (tan δ) of the toner of Example 1.

DESCRIPTION OF EMBODIMENTS

The toner of the present disclosure is a toner comprising colored resin particles containing a binder resin, a colorant, a softening agent and a charge control agent, and an external additive, wherein a glass transition temperature (Tg) specified from a temperature dependence curve of a loss tangent (tan δ) obtained by dynamic viscoelastic measurement of the toner, is 50° C. or more and less than 90° C.; the loss tangent (tan δ) at the glass transition temperature (Tg) is 1.70 or less; in a temperature range of 90° C. or more and 160° C. or less, a lowest temperature (Ta) with a loss tangent of 1.50 is more than 95° C. and less than 145° C.; and a storage elastic modulus (G') at the lowest temperature (Ta) is less than 56000 Pa.

Hereinafter, the viscoelastic characteristics of the toner of the present disclosure, a method for producing colored resin particles used for the toner of the present disclosure, the colored resin particles, an external additive used for the toner of the present disclosure, and the performances of the toner of the present disclosure, will be described in this order.

1. Viscoelastic Characteristics of the Toner

In the toner of the present disclosure, the shape of the temperature dependence curve of the loss tangent (tan δ) obtained by dynamic viscoelastic measurement, has the following characteristics. The curve has at least one peak in a range of 50° C. or more and less than 90° C. After the temperature exceeds the temperature at which the tan δ becomes the maximum value of the peak closest to 90° C., the tan δ decreases with increasing temperature, and then the tan δ reaches a minimum point of less than 1.00. After the temperature exceeds the temperature at the minimum point, the tan δ increases with increasing temperature, and then the tan δ reaches 1.50. In a temperature region higher than the temperature (Ta) with a loss tangent of 1.50, the curve has a peak of which the maximum value of the tan δ is more than 1.50, or the tan δ is substantially constant within a range of more than 1.5 and 1.8 or less, or the tan δ continues to rise. The temperature of the minimum point is generally within a range of 80° C. or more and 100° C. or less.

Also, for the toner of the present disclosure, the glass transition temperature (Tg) specified from the temperature dependence curve of the loss tangent (tan δ) obtained by dynamic viscoelastic measurement of the toner, is 50° C. or more and less than 90° C.; the loss tangent (tan δ) at the glass transition temperature (Tg) is 1.70 or less; in a temperature range of 90° C. or more and 160° C. or less, the lowest temperature (Ta) with a loss tangent (tan δ) of 1.50 is more than 95° C. and less than 145° C.; and the storage elastic modulus (G') at the temperature (Ta) is less than 56000 Pa.

The loss tangent (tan δ) is defined as the ratio (G"/G') of the storage elastic modulus (G') and the loss elastic modulus (G") measured by the dynamic viscoelastic measurement.

In the present disclosure, the glass transition temperature (Tg) specified from the temperature dependence curve of the loss tangent (tan δ) obtained by the dynamic viscoelastic measurement, is specified as the lowest temperature at which the tan δ is the maximum value in the peak of the lowest temperature side among one or more peaks in the temperature range of 50° C. or more and less than 90° C. of the temperature dependence curve of the loss tangent (tan δ) obtained by the dynamic viscoelastic measurement. Fine vertical fluctuations (such as noise) caused by the measurement are not interpreted as the above-mentioned peaks.

In the present disclosure, the dynamic viscoelastic measurement is carried out using a rotating flat plate rheometer (manufactured by: TA Instruments Inc., product name: ARES-G2) and using a parallel plate or a cross hatch plate under the following conditions.

Frequency: 1 Hz

Sample set: Test piece (2 mm to 4 mm thick) is sandwiched between 8 mm φ plates with a 20 g load Heating rate: 5° C./min Temperature range: 40° C. to 150° C.

At the time of sample setting, the temperature is left to stand at 40° C. for 1 minute to fuse the jig, and then the temperature rising is started from 40° C. As a result, the relationship between tan δ and shelf stability (blocking resistance) in the heat-resistant temperature region can be estimated without a collapse of the dispersion structure of the softening agent.

The test piece can be produced by pouring 0.2 g of the toner of the present disclosure into a cylindrical mold of 8 mm φ and pressurizing the toner at 1.0 MPa for 30 seconds, thereby forming a columnar molded product having a diameter of 8 mm φ and a thickness of 2 mm to 4 mm.

The toner of the present disclosure has the specific viscoelastic characteristics in which all of the glass transition temperature (Tg), the loss tangent (tan δ) at the glass transition temperature (Tg), the lowest temperature (Ta) at which the loss tangent (tan δ) is 1.50, and the storage elastic modulus (G') at the temperature (Ta) are controlled. Therefore, the toner of the present disclosure is a toner which can achieve good low-temperature fixability, shelf stability and hot offset resistance, and which can suppress a decrease in the glossiness of the image, which are difficult to achieve for the toner of the prior art.

The viscoelastic characteristics of the toner can be controlled, for example, by appropriately changing the composition and weight average molecular weight Mw of the binder resin contained in the colored resin particles contained in the toner, the type of the colorant, the type and molecular weight of the softening agent, the glass transition point (Tg), weight average molecular weight Mw and addition amount of the charge control resin, and the type and addition amount of the external additive. A specific method for controlling the viscoelasticity of the toner will be described together with the preferable embodiments of the components described later.

For the toner of the present disclosure, blocking during toner storage is suppressed, and the shelf stability is improved, since the glass transition temperature (Tg) is 50°

C. or more and 90° C. or less, and the loss tangent (tan δ) at the glass transition temperature (Tg) is 1.70 or less.

The glass transition temperature (Tg) of the toner may be 55° C. or more and 80° C. or less, or it may be 57° C. or more and 70° C. or less.

The loss tangent (tan δ) at the glass transition temperature (Tg) of the toner is preferably 1.55 or less, more preferably 1.50 or less, and even more preferably 1.40 or less, since blocking during toner storage can be further suppressed and a decrease in the glossiness of the image can be suppressed. The lower limit value of the tan δ is not particularly limited. From the viewpoint of fixability, it is preferably 1.00 or more, and more preferably 1.10 or more.

For the toner of the present disclosure, the lowest temperature (Ta) at which the loss tangent (tan δ) is 1.50 in the temperature range of 90° C. to 160° C., is more than 95° C., whereby the hot offset resistance is favorable. In the toner of the present disclosure, since the temperature (Ta) is less than 145° C., the low-temperature fixability is favorable, and a decrease in the glossiness of the image is suppressed. The temperature (Ta) is preferably 102° C. or more, and more preferably 110° C. or more from the viewpoint of improving the hot offset resistance, while the temperature (Ta) is preferably 140° C. or less from the viewpoint of improving the low temperature fixability and improving the glossiness of the image.

For the toner of the present disclosure, the storage elastic modulus (G') at the temperature (Ta) is less than 56000 Pa, whereby a decrease in the glossiness of the formed image can be suppressed. The storage elastic modulus (G') at the temperature (Ta) is preferably 38000 Pa or less, and more preferably 30000 Pa or less, from the viewpoint of improving the glossiness of the image.

In addition, the softening temperature ($T_{1/2}$) of the toner of the present disclosure, which is measured by a ½ method at a pressure of 5.0 kgf/cm$^2$ using a flow tester, is preferably more than 110° C. and less than 150° C., in terms of compatibility between the low-temperature fixability and the hot offset resistance and suppression of a decrease in the glossiness of the image. From the viewpoint of improving the hot offset resistance, the softening temperature ($T_{1/2}$) is preferably more than 115° C., and more preferably 120° C. or more. From the viewpoint of improving the low temperature fixability and the glossiness of the image, the softening temperature ($T_{1/2}$) is preferably less than 134° C., and more preferably less than 132° C. The softening temperature ($T_{1/2}$) of the toner can be adjusted, for example, by the composition of the binder resin and the like.

The softening temperature ($T_{1/2}$) measured by the ½ method at a pressure of 5.0 kgf/cm$^2$ using the flow tester, can be determined from the flow curves (piston stroke–temperature) measured under the following measurement conditions using a flow tester (product name: CFT-500C) manufactured by Shimadzu Corporation. Specifically, in the flow curve, ½ of the difference between the piston stroke at the outflow ending point and the minimum value of the piston stroke is obtained. Then, the softening temperature ($T_{1/2}$) can be determined as the temperature of the position of the sum of the obtained value and the minimum value.

(Measurement Conditions)

Start temperature: 35° C.
Temperature rising rate: 3° C./min
Preheating time: 5 minutes
Cylinder pressure: 5.0 kgf/cm$^2$
Die hole diameter: 0.5 mm
Die length: 1.0 mm
Sample input: 1.0 g to 1.3 g 2. Method for Producing Colored Resin Particles In general, methods for producing colored resin particles are broadly classified into dry methods such as a pulverization method and wet methods such as an emulsion polymerization agglomeration method, a suspension polymerization method and a solution suspension method. Among them, the wet methods are preferable since a toner having excellent printing characteristics such as image reproducibility, can be easily obtained.

In a method for producing colored resin particles by a wet method, a known method can be used.

In the emulsion polymerization agglomeration method, an emulsified polymerizable monomer is polymerized to obtain a resin microparticle emulsion, and resin microparticles in the emulsion are aggregated with a colorant dispersion, etc., thereby producing colored resin particles.

In the suspension polymerization method, a polymerizable monomer composition which is obtained by mixing toner components such as a polymerizable monomer and a colorant, is formed into droplets in an aqueous solvent, and then the polymerizable monomer is polymerized, thereby producing colored resin particles.

In the solution suspension method, a solution obtained by dissolving or dispersing toner components such as a binder resin and a colorant in an organic solvent, is dispersed in the aqueous solvent and formed into droplets, followed by removal of the organic solvent, thereby producing colored resin particles.

Among the wet methods, polymerization methods such as the emulsion polymerization agglomeration method and the suspension polymerization method are preferable, since a toner having a relatively small particle size distribution in micron order can be easily obtained. Among the polymerization methods, the suspension polymerization method is more preferable.

In the present disclosure, the aqueous solvent is a solvent containing at least water. As needed, it may further contain an organic solvent such as a water-soluble organic solvent. It is preferable that the aqueous solvent contains water in an amount of more than 50% by mass.

Hereinafter, an example of the method for producing the colored resin particles by the suspension polymerization method, which is especially preferable among the wet methods, will be described in detail.

(A) Suspension Polymerization Method

An example of the method for producing the colored resin particles by the suspension polymerization method, is the following production method comprising:

- a step comprising preparing a polymerizable monomer composition containing a polymerizable monomer, a colorant, a softening agent and a charge control agent,
- a step comprising dispersing the polymerizable monomer composition in the aqueous solvent to form the polymerizable monomer composition into droplets (hereinafter, this step may be referred to as "droplets forming step"), and
- a step comprising polymerizing the polymerizable monomer after the droplets forming step (hereinafter, this step may be referred to as "suspension polymerization step").

Hereinafter, these steps will be described in detail.

(A-1) Step Comprising Preparing Polymerizable Monomer Composition

The polymerizable monomer composition contains a polymerizable monomer, a colorant, a softening agent (release agent) and a charge control agent. As needed, it may further contain other additives such as a molecular weight modifier, within a range in which the toner has the The polymerizable monomer composition can be prepared, for example, by mixing the components of the polymerizable monomer composition. For example, a media type dispersing machine is used for the mixing in the preparation of the polymerizable monomer composition.

(Polymerizable Monomer)

In the present disclosure, the polymerizable monomer means a monomer and a macromonomer which have a polymerizable functional group. The polymerizable monomer is polymerized into the binder resin of the colored resin particles.

The polymerizable monomer preferably contains a monovinyl monomer as the main component, since the toner is likely to satisfy the specified viscoelastic characteristics and the softening temperature ($T_{1/2}$) is likely to fall within the preferred range. Specifically, it is preferable to contain the monovinyl monomer in an amount of 50 parts by mass or more, when the total amount of the polymerizable monomer is determined as 100 parts by mass.

Examples of the monovinyl monomer include the following: styrene; styrene derivatives such as vinyltoluene and α-methylstyrene; acrylic acid and methacrylic acid; acrylic esters such as methyl acrylate, ethyl acrylate, propyl acrylate, butyl acrylate, 2-ethylhexyl acrylate and dimethylaminoethyl acrylate; methacrylic esters such as methyl methacrylate, ethyl methacrylate, propyl methacrylate, butyl methacrylate, 2-ethylhexyl methacrylate and dimethylaminoethyl methacrylate; nitrile compounds such as acrylonitrile and methacrylonitrile; amide compounds such as acrylamide and methacrylamide; and olefins such as ethylene, propylene and butylene. The monovinyl monomer preferably contains at least one selected from the group consisting of styrene, styrene derivative, acrylic ester and methacrylic ester, more preferably at least one selected from the group consisting of styrene, acrylic ester and methacrylic ester, and even more preferably styrene and at least one selected from the group consisting of acrylic ester and methacrylic ester. This is because the toner is likely to satisfy the specified viscoelastic characteristics; the softening temperature ($T_{1/2}$) is likely to fall within the preferred range; the environmental stability of the toner can be improved; and especially, a change in the charge of the toner due to a change in humidity can be suppressed. As the acrylic ester, at least one selected from the group consisting of n-butyl acrylate, propyl acrylate and 2-ethylhexyl acrylate is preferable, and as the methacrylic ester, at least one selected from the group consisting of n-butyl methacrylate, propyl methacrylate and 2-ethylhexyl methacrylate is preferable. This is because the toner is likely to satisfy the specified viscoelastic characteristics; the softening temperature ($T_{1/2}$) is likely to fall within the preferred range; and the environmental stability of the toner can be improved.

These monovinyl monomers may be used solely or in combination of two or more kinds. The total of the preferable monovinyl monomer is preferably 60 parts by mass or more, more preferably 70 parts by mass or more, even more preferably 80 parts by mass or more, and still more preferably 90 parts by mass or more, when the total amount of the monovinyl monomer is determined as 100 parts by mass. This is because the toner is likely to satisfy the specified viscoelastic characteristics; the softening temperature ($T_{1/2}$) is likely to fall within the preferred range; and the environmental stability of the toner can be improved.

The monovinyl monomer preferably contains at least one selected from the group consisting of acrylic ester and methacrylic ester, and the mass ratio of styrene to the sum of acrylic ester and methacrylic ester (styrene (meth)acrylic ester) is preferably within a range from 50:50 to 90:10, and more preferably within a range from 60:40 to 80:20. This is because the toner is likely to satisfy the specified viscoelastic characteristics; the softening temperature ($T_{1/2}$) is likely to fall within the preferred range; and the environmental stability of the toner can be improved.

When the polymerizable monomer contains a polymerizable monomer other than the monovinyl monomer, the content of the monovinyl monomer is appropriately adjusted so that the toner has the specified viscoelastic characteristics. The content of the monovinyl monomer is not particularly limited, and it is preferably 90 part by mass or more, more preferably 95 parts by mass or more, and even more preferably 98 parts by mass or more, when the total amount of the polymerizable monomer is determined as 100 parts by mass. This is because the toner is likely to satisfy the specified viscoelastic characteristics; the softening temperature ($T_{1/2}$) is likely to fall within the preferred range; and the environmental stability of the toner can be improved.

The polymerizable monomer may contain a crosslinkable polymerizable monomer in combination with the monovinyl monomer. It is preferable that the polymerizable monomer contains a crosslinkable polymerizable monomer, since the viscoelastic characteristics of the toner can be adjusted, and the shelf stability and the hot offset resistance can be easily improved.

The crosslinkable polymerizable monomer means a monomer having two or more polymerizable functional groups.

As the crosslinkable polymerizable monomer, examples include, but are not limited to, the following: aromatic divinyl compounds such as divinyl benzene, divinyl naphthalene and derivatives thereof; ester compounds such as ethylene glycol dimethacrylate and diethylene glycol dimethacrylate, in which two or more carboxylic acids are esterified to an alcohol having two or more hydroxyl groups; other divinyl compounds such as N,N-divinylaniline and divinyl ether; and compounds having three or more vinyl groups. Among them, aromatic divinyl compounds are preferable, since the toner is likely to satisfy the specified viscoelastic characteristics, and the softening temperature ($T_{1/2}$) is likely to fall within the preferred range.

These crosslinkable polymerizable monomers can be used solely or in combination of two or more kinds.

When the polymerizable monomer contains the crosslinkable polymerizable monomer, the content of the crosslinkable polymerizable monomer is appropriately adjusted so that the toner has the specified viscoelastic characteristics. The content of the crosslinkable polymerizable monomer is not particularly limited, and it is preferably 0.05 parts by mass or more and 5 parts by mass or less, more preferably 0.06 parts by mass or more and 1.5 parts by mass or less, and even more preferably 0.08 parts by mass or less and 0.8 parts by mass or more, with respect to 100 parts by mass of the monovinyl monomer, since the toner is likely to satisfy the specified viscoelastic characteristics, and the softening temperature ($T_{1/2}$) is likely to fall within the preferred range. By adjusting the content of the crosslinkable polymerizable monomer, the temperature (Ta) and the storage elastic modulus (G') at the temperature (Ta) can be adjusted. There is a tendency such that as the content of the crosslinkable polymerizable monomer increases, the storage elastic modulus (G') in a temperature region of the glass transition temperature (Tg) and above increases, and the temperature (Ta) increases.

The polymerizable monomer may contain a macromonomer in combination with the monovinyl monomer. When the polymerizable monomer contains a macromonomer, the balance between the shelf stability and low-temperature fixability of the toner can be improved.

As the macromonomer, examples include a reactive oligomer or polymer which has a polymerizable carbon-carbon unsaturated double bond at the end of the molecular chain and which has a number average molecular weight of generally from 1,000 to 30,000. As the macromonomer, examples include a styrene macromonomer, a styrene-acrylonitrile macromonomer, a polyacrylic ester macromonomer and a polymethacrylic ester macromonomer. Among them, at least one selected from a polyacrylic ester macromonomer and a polymethacrylic ester macromonomer is preferably used, since it is easy to control the glass transition temperature (Tg) of the toner. As the acrylic ester used in the polyacrylic ester macromonomer, examples include the above-mentioned acrylic esters usable as the monovinyl monomer. As the methacrylic ester used in the polymethacrylic ester macromonomer, examples include the above-mentioned methacrylic esters usable as the monovinyl monomer. As the macromonomer, it is preferable to appropriately select and use such a macromonomer, that when the polymerizable monomer contains the macromonomer, the glass transition temperature (Tg) of the obtained binder resin becomes higher than the case where the polymerizable monomer does not contain the macromonomer. This is because the glass transition temperature (Tg) of the toner is likely to fall within the preferable range.

As the macromonomer, a commercially-available product may be used. Examples of the commercially-available product of the macromonomer include macromonomer series AA-6, AS-6, AN-6S, AB-6 and AW-6S manufactured by TOAGOSEI Co., Ltd.

These macromonomers can be used alone or in combination of two or more kinds.

When the polymerizable monomer contains the macromonomer, the content of the macromonomer is appropriately adjusted so that the toner has the specified viscoelastic characteristics. The content of the macromonomer is not particularly limited, and it is preferably 0.03 parts by mass or more and 5 parts by mass or less, and more preferably 0.05 parts by mass or more and 1 part by mass or less, with respect to 100 parts by mass of the monovinyl monomer.

As the polymerizable monomer, one or two or more kinds of polymerizable monomers containing at least one kind of monovinyl monomer selected from the group consisting of styrene, acrylic ester and methacrylic ester, are preferable, and one or two or more kinds of polymerizable monomers containing styrene and at least one kind of monovinyl monomer selected from the group consisting of acrylic ester and methacrylic ester, are more preferable. This is because the toner is likely to satisfy the specified viscoelastic characteristics; the softening temperature ($T_{1/2}$) is likely to fall within the preferred range; all of hot offset resistance, suppression of a decrease in shelf stability, and suppression of a decrease in the gloss of the image are likely to be achieved; and the toner has excellent low-temperature fixability.

The total content of the polymerizable monomer is appropriately adjusted so that the toner has the specified viscoelastic characteristics. The total content of the polymerizable monomer is not particularly limited, and it is preferably 60 parts by mass or more and 95 parts by mass or less, more preferably 65 parts by mass or more and 90 parts by mass or less, and even more preferably 70 parts by mass or more and 85 parts by mass or less, when the total solid content contained in the polymerizable monomer composition is determined as 100 parts by mass, since the toner is likely to satisfy the specified viscoelastic characteristics.

In the present disclosure, "solid content" means all components other than solvents, and liquid monomers and the like are included in the "solid content".

(Colorant)

As the colorant contained in the polymerizable monomer composition, a colorant that is conventionally used for toners may be appropriately selected, and the colorant is not particularly limited. When producing a color toner, a black colorant, a cyan colorant, a yellow colorant and a magenta colorant can be used.

Examples of the black colorant to be used include carbon black, titanium black and magnetic powder such as zinc-iron oxide and nickel-iron oxide.

Examples of the cyan colorant to be used include cyan pigments such as copper phthalocyanine compounds, derivatives thereof and anthraquinone compounds, and cyan dyes. The specific examples include C.I. Pigment Blue 2, 3, 6, 15, 15:1, 15:2, 15:3, 15:4, 16, 17:1, 60; and C.I. Solvent Blue 70.

Examples of the yellow colorant to be used include yellow pigments such as azo pigments such as monoazo pigments and disazo pigments, condensed polycyclic pigments, and yellow dyes. The specific examples include C.I. Pigment Yellow 3, 12, 13, 14, 15, 17, 62, 65, 73, 74, 83, 93, 97, 120, 138, 155, 180, 181, 185, 186, 213 and 214; and C.I. Solvent Yellow 98, 162.

Examples of the magenta colorant to be used include magenta pigments such as azo pigments such as monoazo pigments and disazo pigments, condensed polycyclic pigments, and magenta dyes. The specific examples include C.I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, 237, 238, 251, 254, 255 and 269; C.I. Pigment Violet 19; C.I. Solvent Red 1, 3, 8, 23, 24, 25, 27, 30, 49, 81, 82, 83, 84, 100, 109, 121; C.I. Disperse Red 9; C.I. Solvent Violet 8, 13, 14, 21, 27; C.I. Disperse Violet 1; C.I. Basic Red 1, 2, 9, 12, 13, 14, 15, 17, 18, 22, 23, 24, 27, 29, 32, 34, 35, 36, 37, 38, 39, 40; and C.I. Basic Violet 1, 3, 7, 10, 14, 15, 21, 25, 26, 27, 28.

These colorants can be used alone or in combination of two or more kinds. In order to improve image quality, a pigment and a dye can be used in combination as the colorant.

For a black toner, it is preferable that a carbon black is contained as the colorant, since the toner is likely to satisfy the specified viscoelastic characteristics, and high-quality image can be formed.

For a cyan toner, it is preferable that a copper phthalocyanine compound and a derivative thereof are contained as the colorant, since the toner is likely to satisfy the specified viscoelastic characteristics, and high-quality image can be formed.

For a yellow toner, it is preferable that at least one selected from the group consisting of disazo pigments such as C.I. Pigment Yellow 93, 155, 180, 214 and 219, and yellow dyes such as C.I. Solvent Yellow 98 and 162, is contained as the colorant. This is because the toner is likely to satisfy the specified viscoelastic characteristics; the shelf stability of the toner is likely to be improved; and a high-quality image can be formed. It is more preferable that at least one of C.I. Pigment Yellow 155, C.I. Pigment Yellow 214 and C.I. Solvent Yellow 98 is contained, and it is even more preferable that at least one of C.I. Pigment Yellow 214 and C.I. Solvent Yellow 98 is contained. In addition, for the yellow toner, it is preferable that a combination of a disazo pigment and a yellow dye is contained as the colorant. This is because the toner is likely to satisfy the specified viscoelastic characteristics; the shelf stability of the toner is likely to be improved; and a high-quality image can be formed. It is more preferable that a combination of C.I. Solvent Yellow 98 and at least one of C.I. Pigment Yellow 155 and C.I. Pigment Yellow 214 is contained, and it is even more preferable that a combination of C.I. Pigment Yellow 214 and C.I. Solvent Yellow 98 is contained. Also for the yellow toner, the mass ratio of the yellow pigment to the yellow dye contained in the yellow colorant (yellow pigment:yellow dye) is preferably within a range of from 50:50 to 95:5, and it is more preferably within a range of from 60:40 to 90:10. The yellow pigment contained in the yellow colorant is preferably a disazo pigment, more preferably at least one of C.I. Pigment Yellow 155 and C.I. Pigment Yellow 214, and even more preferably C.I. Pigment Yellow 214. The yellow dye contained in the yellow colorant is preferably C.I. Solvent Yellow 98.

For a magenta toner, it is preferable that C.I. Pigment Red 122 is contained as the colorant, since the toner is likely to satisfy the specified viscoelastic characteristics, and a high-quality image can be formed.

The content of the colorant is appropriately adjusted according to the type of the colorant so that the desired color development is obtained and the toner has the specific viscoelastic characteristics. The content of the colorant is not particularly limited, and it is preferably 1 part by mass or more and 20 parts by mass or less, and more preferably 5 parts by mass or more and 15 parts by mass or less, with respect to 100 parts by mass of the monovinyl monomer, since the toner is likely to satisfy the (Softening Agent)

As the softening agent (release agent) contained in the polymerizable monomer composition, a softening agent that is generally used as a softening agent or release agent for toners, is appropriately selected and used, and it is not particularly limited. When the polymerizable monomer composition contains the softening agent, the releasability of the toner from a fixing roller during fixing, can be improved.

As the softening agent, examples include low-molecular-weight polyolefin waxes and modified waxes thereof; petroleum waxes such as paraffin; mineral waxes such as ozokerite; synthetic waxes such as Fischer-Tropsch wax; and ester waxes such as dipentaerythritol ester and carnauba. Since the viscoelastic characteristics of the toner are adjusted, and the toner can achieve a balance between shelf stability and low-temperature fixability, ester waxes are preferable; synthetic ester waxes that are obtained by esterifying an alcohol with a carboxylic acid, are more preferable; and polyfunctional ester waxes that are obtained by esterifying a polyalcohol with a mono-carboxylic acid, are even more preferable.

For example, as the polyfunctional ester wax, at least one selected from the group consisting of pentaerythritol ester compounds, glycerin ester compounds and dipentaerythritol ester compounds is preferably used.

As the preferable polyfunctional ester wax, examples include, but are not limited to, pentaerythritol ester compounds such as pentaerythritol tetrapalmitate, pentaerythritol tetrabehenate and pentaerythritol tetrastearate; glycerin ester compounds such as hexaglycerin tetrabehenate tetrapalmitate, hexaglycerin octabehenate, pentaglycerin heptabehenate, tetraglycerin hexabehenate, triglycerin pentabehenate, diglycerin tetrabehenate and glycerin tribehenate; and dipentaerythritol ester compounds such as dipentaerythritol hexamyristate and dipentaerythritol hexapalmitate.

The softening agent preferably has a weight average molecular weight Mw within a range of 400 or more and 3500 or less, and more preferably within a range of 500 or more and 3000 or less. As the weight average molecular weight Mw of the softening agent increases, the transition temperature (Tg) of the toner is likely to shift toward the high temperature side; the tan δ at the glass transition temperature (Tg) of the toner is likely to decrease; the temperature (Ta) at which tan δ=1.5 of the toner is likely to increase; and the softening temperature ($T_{1/2}$) of the toner is likely to increase. Further, as the weight average molecular weight Mw of the softening agent decreases, the storage elastic modulus (G') at the temperature (Ta) is likely to decrease.

The weight average molecular weight Mw of the softening agent can be measured by the same method as of the method for measuring the weight average molecular weight Mw of the polymer described later. In the case of the ester wax, it is also possible to calculate the weight average molecular weight Mw by the following procedure. First, the ester wax is extracted with a solvent; the ester wax is decomposed into alcohol and carboxylic acid by hydrolysis; and by carrying out a composition analysis, the molecular weight of the ester wax can be calculated from the structural formula. The weight average molecular weight Mw of the ester wax has the same result as the molecular weight calculated from the structural formula.

From the viewpoint of improving the balance between the shelf stability and low-temperature fixability of the toner by adjusting the viscoelasticity of the toner, the melting point of the softening agent is preferably within the range of 50° C. or more and 90° C. or less, more preferably within the range of 60° C. or more and 85° C. or less, and even more preferably within the range of 70° C. or more and 80° C. or less.

The content of the softening agent is not particularly limited, and it is preferably 1 part by mass or more and 30 parts by mass or less, and more preferably 5 parts by mass or more and 20 parts by mass or less, with respect to 100 parts by mass of the monovinyl monomer, since the viscoelastic characteristics of the toner is adjusted, and the balance between the shelf stability and low-temperature fixability of the toner can be improved.

The above softening agents can be used solely or in combination of two or more kinds.

(Charge Control Agent)

As the charge control agent contained in the polymerizable monomer composition, a charge control agent that is generally used as a positively- or negatively-chargeable charge control agent to improve chargeability of toners, is appropriately selected and used, and it is not particularly limited.

As the positively-chargeable charge control agent, examples include charge control compounds such as a nigrosine dye, a quaternary ammonium salt, a triaminotriphenylmethane compound, an imidazole compound and a positively-chargeable charge control resin. As the negatively-chargeable charge control agent, examples include charge control compounds such as an azo dye containing a metal such as Cr, Co, Al and Fe, a salicylic acid metal compound, an alkyl salicylic acid metal compound, and a negatively-chargeable charge control resin.

As the charge control agent, a positively- or negatively-chargeable charge control resin is preferable. This is because the charge control resin is highly compatible with the polymerizable monomer; it can impart stable chargeability (charge stability) to the toner particles; it has excellent charge stability; and the toner is likely to satisfy the specified viscoelastic characteristics.

As the positively- or negatively-chargeable charge control resin, a functional group-containing copolymer can be used. Specifically, as the positively-chargeable charge control resin, for example, a functional group-containing copolymer that contains a constitutional unit containing a functional group such as an amino group, a quaternary ammonium group or a quaternary ammonium salt-containing group, can be used. As the negatively-chargeable charge control resin, for example, a functional group-containing copolymer that contains a constitutional unit containing a functional group such as a sulfonic acid group, a sulfonate-containing group, a carboxylic acid group or a carboxylic acid salt-containing group, can be used.

For the functional group-containing copolymer used as the positively- or negatively-chargeable charge control resin, the functional group-containing constitutional unit is preferably in an amount of 3% by mass or less, and more preferably in an amount of 2.5% by mass or less, since the toner is likely to satisfy the specific viscoelastic characteristics. On the other hand, from the viewpoint of charge stability, the amount of the functional group-containing constitutional unit in the functional group-containing copolymer is preferably 0.5% by mass or more.

The functional group-containing copolymer used as the positively- or negatively-chargeable charge control resin, is preferably a styrene-acrylic resin since the compatibility with the polymerizable monomer is high and the toner is likely to satisfy the specific viscoelastic characteristics.

The glass transition temperature (Tg) of the functional group-containing copolymer used as the positively- or negatively-chargeable charge control resin, is preferably within a range of 50° C. or more and 110° C. or less, and more preferably within a range of 60° C. or more and 100° C. or less. When the transition temperature (Tg) of the functional group-containing copolymer is within the above range, the tan $\delta$ at the glass transition temperature (Tg) of the toner is likely to decrease. The glass transition temperature (Tg) of the functional group-containing copolymer is measured by the same method as that of the glass transition temperature (Tg) of the toner described above.

The weight average molecular weight Mw of the functional group-containing copolymer used as the positively- or negatively-chargeable charge control resin, is preferably within a range of 5000 or more and 30000 or less, and more preferably within a range of 10000 or more and 25000 or less. When the weight average molecular weight Mw of the functional group-containing copolymer is within the above range, the temperature (Ta) of the toner is likely to fall within the above preferable range, and the storage elastic modulus (G') at the temperature (Ta) is likely to decrease.

In the present disclosure, the weight average molecular weight Mw of the polymer is a polystyrene equivalent molecular weight measured by gel permeation chromatography (GPC) using tetrahydrofuran (THE), for example.

The content of the charge control agent is not particularly limited, and it is preferably 0.01 parts by mass or more and 15 parts by mass or less, and more preferably 0.03 parts by mass or more and 8 parts by mass or less, with respect to 100 parts by mass of the monovinyl monomer. When the content of the charge control agent is equal to or more than the lower limit value, the occurrence of fog can be suppressed. When the content is equal to or less than the upper limit value, printing stains can be suppressed. The viscoelasticity of the toner can be adjusted by adjusting the content of the charge control agent. As the content of the charge control agent increases, the tan $\delta$ at the glass transition temperature (Tg) of the toner is likely to increase; the temperature (Ta) at which tan $\delta$=1.5 of the toner is likely to decrease; and the storage elastic modulus (G') at the temperature (Ta) is likely to decrease.

The above charge control agents may be used solely or in combination of two or more kinds.

(Other Additives)

The polymerizable monomer composition may further contain other additives, if necessary, within a range in which the toner has the specific viscoelastic characteristics.

For example, a molecular weight modifier is preferably used as another additive.

The molecular weight modifier is not particularly limited, as long as it is one that is generally used as a molecular weight modifier for toners. As the molecular weight modifier, examples include, but are not limited to, mercaptans such as t-dodecyl mercaptan, n-dodecyl mercaptan, n-octyl mercaptan and 2,2,4,6,6-pentamethylheptane-4-thiol, and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide.

These molecular weight modifiers may be used solely or in combination of two or more kinds.

When the polymerizable monomer composition contains the molecular weight modifier, the content of the molecular weight modifier is appropriately adjusted so that the binder resin has the desired molecular weight. The content of the molecular weight modifier is not particularly limited, and it is generally from 0.01 parts by mass to 10 parts by mass, and may be from 0.1 parts by mass to 5 parts by mass, with respect to 100 parts by mass of the monovinyl monomer.

The polymerizable monomer composition may further contain a polymerization initiator, and the polymerization initiator may be added to a dispersion that is obtained in the below-described droplets forming step. Since the molecular weight of the polymer can be easily controlled, the polymerization initiator is preferably added to the dispersion in the droplets forming step described below, which is obtained by dispersing the polymerizable monomer composition in the aqueous solvent.

(A-2) Droplets Forming Step

This is a step comprising forming the polymerizable monomer composition into droplets by dispersing the polymerizable monomer composition in the aqueous solvent. In this step, it is preferable to disperse the polymerizable monomer composition in the aqueous solvent containing a dispersion stabilizer, since the particle size distribution of the colored resin particles is likely to be narrow.

As the dispersion stabilizer, examples include the following inorganic and organic compounds: inorganic compounds including sulfates such as barium sulfate and calcium sulfate, carbonates such as barium carbonate, calcium carbonate and magnesium carbonate, phosphates such as calcium phosphate, metal oxides such as aluminum oxide and titanium oxide, and metal hydroxides such as aluminum hydroxide, magnesium hydroxide and iron(II) hydroxide, and organic compounds including water-soluble polymers such as polyvinyl alcohol, methyl cellulose and gelatin; anionic surfactants, nonionic surfactants, and ampholytic surfactants. These dispersion stabilizers can be used solely or in combination of two or more kinds.

Among the above dispersion stabilizers, the inorganic compounds are preferable. As an aqueous solvent containing the dispersion stabilizer, a colloid of a hardly water-soluble metal hydroxide is particularly preferable. The use of the inorganic compounds, particularly the use of the colloid of the hardly water-soluble metal hydroxide, can narrow the particle size distribution of the colored resin particles and can reduce the amount of the dispersion stabilizer remaining after washing. Accordingly, the polymerized toner thus obtained becomes capable of reproducing clear images and inhibiting a deterioration in environmental stability.

The added amount of the dispersion stabilizer is not particularly limited. In the aqueous solvent, the dispersion stabilizer is preferably contained in an amount of 3 parts by mass or more and 20 parts by mass or less, and more preferably 5 parts by mass or more and 10 parts by mass or less, with respect to 100 parts by mass of the monovinyl monomer, from the viewpoint of the dispersion stability of the droplets.

In the droplets forming step, it is preferable that the polymerization initiator is added to the dispersion obtained by dispersing the polymerizable monomer composition in the aqueous solvent, since the molecular weight of the polymer can be easily controlled.

As the polymerization initiator, a thermal radical polymerization initiator is preferably used. As the thermal radical polymerization initiator, examples include persulfates such as potassium persulfate and ammonium persulfate; azo compounds such as 4,4'-azobis(4-cyanovaleric acid), 2,2'-azobis(2-methyl-N-(2-hydroxyethyl)propionamide), 2,2'-azobis(2-amidinopropane)dihydrochloride, 2,2'-azobis(2,4-dimethylvaleronitrile) and 2,2'-azobisisobutyronitrile; and organic peroxides such as di-t-butylperoxide, benzoylperoxide, t-butylperoxy-2-ethylhexanoate, t-butylperoxy-2-ethylbutanoate, t-hexylperoxy-2-ethylbutanoate, diisopropylperoxydicarbonate, di-t-butylperoxyisophthalate and t-butylperoxyisobutyrate. They can be used solely or in combination of two or more kinds. Among them, the organic peroxides are preferable since they can reduce a residual polymerizable monomer and can impart excellent printing durability.

Among the organic peroxides, peroxy esters are preferable, and non-aromatic peroxy esters (i.e., peroxy esters having no aromatic ring) are more preferable, since they have good initiator efficiency and can reduce a residual polymerizable monomer.

It is preferable that the added amount of the polymerization initiator is appropriately adjusted so that the weight average molecular weight Mw of the polymer is within the preferable range described later. The added amount of the polymerization initiator is not particularly limited, and it is preferably 0.1 parts by mass or more, more preferably 0.3 parts by mass or more, and even more preferably 1 part by mass or more, with respect to 100 parts by mass of the monovinyl monomer, since a polymerization reaction can sufficiently proceed. With respect to 100 parts by mass of the monovinyl monomer, the added amount of the polymerization initiator is preferably 20 parts by mass or less, more preferably 15 parts by mass or less, and even more preferably 10 parts by mass or less, from the viewpoint of falling the molecular weight of the polymer within the preferred range.

The formation of the droplets of the polymerizable monomer composition can be carried out by a known method, and it is not particularly limited. For example, as the method for forming the droplets, the use of a device capable of strong stirring, such as an in-line type emulsifying and dispersing machine (product name: MILDER; manufactured by Pacific Machinery & Engineering Co., Ltd.), an in-line type emulsifying and dispersing machine (product name: CAVITRON; manufactured by Pacific Machinery & Engineering Co., Ltd.), and a high-speed emulsification dispersing machine (product name: T. K. HOMOMIXER MARK II; manufactured by PRIMIX Corporation) is preferable, since the particle size distribution of the colored resin particles is likely to be narrow.

(A-3) Suspension Polymerization Step

After the droplet formation, the suspension polymerization step of polymerizing the polymerizable monomer is carried out, for example, by heating the dispersion liquid after the droplet formation to initiate a polymerization reaction. By the suspension polymerization step, an aqueous dispersion in which colored resin particles are dispersed, can be obtained. The condition of the heating is preferably adjusted so that the weight average molecular weight Mw of the polymer of the polymerizable monomer falls within a preferable range described later. The heating temperature is not particularly limited, and it is preferably 50° C. or more, and more preferably 60° C. or more and 95° C. or less. The heating time is preferably 1 hour or more and 20 hours or less, and more preferably 2 hours or more and 15 hours or less.

In addition, to make the obtained colored resin particles into so-called core-shell type (or also referred to as "capsule type") colored resin particles, the suspension polymerization step may include, after the droplet formation, a step comprising forming colored resin particles serving as a core layer by polymerizing the polymerizable monomer, and a step comprising forming a shell layer made of a material different from the core layer on the outside of the core layer, using the colored resin particles as the core layer. These steps are not particularly limited. It is preferable that the core layer made of a material having a relatively low softening point, is coated with a shell layer made of a material having a softening point higher than that of the core layer, from the viewpoint of easily balancing the lowering of the fixing temperature and the suppression of the aggregation during storage. By using the core-shell type colored resin particles as the colored resin particles, the toner is likely to satisfy the specific viscoelastic characteristics described above.

The method for producing the above-mentioned core-shell type colored resin particles by using the above-mentioned colored resin particles which are obtained by the polymerization of the droplets of the polymerizable monomer composition and which serve the core layer, is not particularly limited. The core-shell type colored resin particles can be produced by any conventional method. The in situ polymerization method and the phase separation method are preferable from the viewpoint of production efficiency.

For example, by the in situ polymerization method, the core-shell type colored resin particles can be obtained by adding the polymerizable monomer for forming the shell layer (the polymerizable monomer for shell) and the polymerization initiator to the aqueous solvent in which the colored resin particles are dispersed, and then polymerizing the monomer. The colored resin particles are obtained by the polymerization of the droplets of the polymerizable monomer composition and serve as the core layer.

As the polymerizable monomer for shell, one having a softening point higher than that of the core layer can be appropriately selected and used from the polymerizable monomers described above. Among the polymerizable monomers, those that can provide a polymer having a Tg of more than 80° C., such as styrene, acrylonitrile and methyl methacrylate, are preferably used solely or in combination of two or more kinds.

As the polymerization initiator used for the polymerization of the polymerizable monomer for shell, examples include, but are not limited to, water-soluble polymerization initiators including metal persulfates such as potassium persulfate and ammonium persulfate, and azo-type initiators such as 2,2'-azobis(2-methyl-N-(2-hydroxyethyl)propionamide) and 2,2'-azobis(2-methyl-N-(1,1-bis(hydroxymethyl)-2-hydroxyethyl)propionamide). These polymerization initiators can be used solely or in combination of two or more kinds.

The content of the polymerization initiator used for the polymerization of the polymerizable monomer for shell, is preferably 0.1 parts by mass or more and 30 parts by mass or less, and more preferably 1 part by mass or more and 20 parts by mass or less, with respect to 100 parts by mass of the polymerizable monomer for shell.

The polymerization temperature of the shell layer is preferably 50° C. or more, and more preferably 60° C. or more and 95° C. or less. The polymerization reaction time is preferably from 1 to 20 hours, and more preferably from 2 to 15 hours.

(A-4) Post-Treatment Step

By the suspension polymerization step, an aqueous dispersion of the colored resin particles which may be core-shell type, is obtained. After the polymerization is completed, as a post-treatment, operations of filtering, washing for removal of the dispersion stabilizer, dehydrating, and drying are preferably carried out on the aqueous dispersion of the colored resin particles by several times as needed, according to any conventional method.

The washing operation may be carried out by the following method: when the inorganic compound is used as the dispersion stabilizer, it is preferable that the dispersion stabilizer is dissolved in water and removed by adding acid or alkali to the aqueous dispersion of the colored resin particles. When the colloid of the hardly water-soluble inorganic hydroxide is used as the dispersion stabilizer, it is preferable that the pH of the aqueous dispersion of the colored resin particles is adjusted to 6.5 or less by adding acid. As the added acid, examples include inorganic acid such as sulfuric acid, hydrochloric acid and nitric acid, and organic acid such as formic acid and acetic acid. Among them, sulfuric acid is particularly preferable for its high removal efficiency and small impact on production facilities.

The dehydrating and filtering operations may be carried out by any of various known methods, without particular limitation. For example, a centrifugal filtration method, a vacuum filtration method and a pressure filtration method may be used. Also, the drying operation may be carried out by any of various methods, without particular limitation.

(B) Pulverization Method

In the case of producing the colored resin particles by employing the pulverization method, the production is carried out by the following steps, for example.

First, the binder resin, the colorant, the softening agent, the charge control agent, and other additives which are added as needed to the extent that the toner has the specified viscoelastic characteristics, are mixed by means of a mixer such as a ball mill, a V type mixer, FM MIXER (: product name), a high-speed dissolver, an internal mixer and a fallberg. Next, the thus-obtained mixture is kneaded while heating by means of a press kneader, a twin screw kneading machine, a roller or the like. The thus-obtained kneaded product is coarsely pulverized by means of a pulverizer such as a hammer mill, a cutter mill and a roller mill. The coarsely pulverized product is finely pulverized by means of a pulverizer such as a jet mill and a high-speed rotary pulverizer. Then, the finely pulverized product is classified into desired particle diameters by means of a classifier such as an air classifier and an airflow classifier, thereby obtaining the colored resin particles produced by the pulverization method.

As the binder resin used in the pulverization method, a polymer obtained by the polymerization of the polymerizable monomer mentioned above in "(A) Suspension polymerization method" can be used, and the same applies to the binder resin contained in the colored resin particles described later. As the colorant, softening agent and charge control agent used in the pulverization method, those mentioned above in "(A) Suspension polymerization method" can be used. Similarly to the colored resin particles obtained by the above-mentioned (A) Suspension polymerization method, the colored resin particles obtained by the pulverization method can also be used in a method such as a in situ polymerization method to produce core-shell type colored resin particles.

3. Colored Resin Particles

The colored resin particles used in the present disclosure are obtained by the production method such as the above-mentioned "(A) Suspension polymerization method" and "(B) Pulverization method".

Hereinafter, the colored resin particles contained in the toner of the present disclosure will be described. The colored resin particles described below include both core-shell type colored resin particles and colored resin particles which are not core-shell type.

The colored resin particles used in the present disclosure contains the binder resin, the colorant, the softening agent and the charge control agent. The colored resin particles may further contain other additives if necessary, within a range in which the toner has the specific viscoelastic characteristics.

Examples of the binder resin contained in the colored resin particles include the polymer obtained by polymerizing the polymerizable monomer mentioned above in the "(A) Suspension polymerization method". In the present disclosure, the polymer may be either a homopolymer or a copolymer. Preferable polymerizable monomers which derive the constitutional units of the polymer are similar to the preferred polymerizable monomers described above in the "(A) Suspension polymerization method". The binder resin contained in the colored resin particles is preferably a polymer of one or two or more kinds of polymerizable monomers containing at least one kind of monovinyl monomer selected from the group consisting of styrene, acrylic ester and methacrylic ester, and more preferably a polymer of one or two or more kinds of polymerizable monomers containing styrene and at least one kind of monovinyl monomer selected from the group consisting of acrylic ester and methacrylic ester. This is because the toner is likely to satisfy the specific viscoelastic characteristics; all of hot offset resistance, suppression of a decrease in shelf stability, and suppression of a decrease in the gloss of the image are likely to be achieved; the toner has excellent low-temperature fixability; the environmental stability of the toner can be improved; and especially, a change in the charge of the toner due to a change in humidity can be suppressed.

With respect to 100% by mass of all constitutional units of the polymer, the amount of the constitutional unit derived from the monovinyl monomer is preferably 90% by mass or more, more preferably 95% by mass or more, and even more preferably 98% by mass or more, since the toner is likely to satisfy the specific viscoelastic characteristics.

The amount of each constitutional unit in all constitutional units of the polymer can be determined from the charge amount used to synthesize the polymer, or it can be calculated from an integration value obtained by 1H-NMR measurement.

In addition, with respect to 100% by mass of the constitutional unit derived from the monovinyl monomer of the polymer, the amount of the total of the constitutional units derived from the preferred monovinyl monomer mentioned above in the "(A) Suspension polymerization method" is preferably 60% by mass or more, more preferably 70% by mass or more, even more preferably 80% by mass or more, and particularly preferably 90% by mass or more, since the toner is likely to satisfy the specific viscoelastic characteristics.

Since the toner is likely to satisfy the specific viscoelastic characteristics, the polymer contains a constitutional unit derived from styrene and a constitutional unit derived from at least one selected from the group consisting of acrylic ester and methacrylic ester, and the mass ratio (styrene:(meth)acrylic ester) of the constitutional unit derived from styrene and the total of the constitutional unit derived from acrylic ester and the constitutional unit derived from methacrylic ester is preferably within a range of from 50:50 to 90:10, and more preferably within a range of from 60:40 to 80:20.

When the polymer contains a constitutional unit derived from the crosslinkable polymerizable monomer, the amount of the constitutional unit derived from the crosslinkable polymerizable monomer is appropriately adjusted so that the toner has the specific viscoelastic characteristics, and it is not particularly limited. Since the toner is likely to satisfy the specific viscoelastic characteristics, the amount of the constitutional unit derived from the crosslinkable polymerizable monomer is preferable 0.05 parts by mass or more and 5 parts by mass or less, and more preferably 0.1 parts by mass or more and 1 part by mass or less, with respect to 100 parts by mass of the constitutional unit derived from the monovinyl monomer.

When the polymer contains a constitutional unit derived from the macromonomer, the amount of the constitutional unit derived from the macromonomer is appropriately adjusted so that the toner has the specific viscoelastic characteristics, and it is not particularly limited. It is preferably 0.03 parts by mass or more and 5 parts by mass or less, and more preferably 0.05 parts by mass or more and 1 part by mass or less, with respect to 100 parts by mass of the constitutional unit derived from the monovinyl monomer.

The weight average molecular weight Mw of the polymer is appropriately adjusted so that the toner has the specific viscoelastic characteristics, and it is not particularly limited. The weight average molecular weight Mw of the polymer is preferably 25000 or more and 100000 or less, and more preferably 30000 or more and 80000 or less, since the toner is likely to satisfy the specific viscoelastic characteristics. As the weight average molecular weight Mw of the polymer increases, the tan δ at the glass transition temperature (Tg) of the toner is likely to decrease; the temperature (Ta) at which tan δ=1.5 of the toner is likely to increase; and the softening temperature ($T_{1/2}$) of the toner is likely to increase.

The binder resin contained in the colored resin particles is typically the above-mentioned polymer. However, a small amount of a binder resin such as a polyester resin and an epoxy resin, which has been conventionally widely used for toners, or a small amount of an unreacted polymerizable monomer may be contained within a range in which the toner has the specific viscoelastic characteristics. The content of the polyester resin contained in 100 parts by mass of the binder resin, is preferably 5 parts by mass or less, more preferably 1 part by mass or less, and even more preferably 0.1 parts by mass or less. It is particularly preferable that the binder resin does not contain a polyester resin. When the content of the polyester resin is equal to or less than the upper limit value, the environmental stability of the toner can be improved. Especially, a change in the toner charge due to a change in humidity can be suppressed.

When the binder resin contains a resin other than the above-mentioned polymer, the content of the polymer in 100 parts by mass of the binder resin, is preferably 95 parts by mass or more, more preferably 97 parts by mass or more, and even more preferably 99 parts by mass or more, since the toner is likely to satisfy the specific viscoelastic characteristics.

The content of the binder resin is appropriately adjusted so that the toner has the specific viscoelastic characteristics, and it is not particularly limited. The content of the binder resin is preferably 60 parts by mass or more and 95 parts by mass or less, more preferably 65 parts by mass or more and 90 parts by mass or less, and even more preferably 70 parts by mass or more and 85 parts by mass or less, when the total solid content contained in the colored resin particles is determined as 100 parts by mass, since the toner is likely to satisfy the specific viscoelastic characteristics.

The colorant, softening agent and charge control agent contained in the colored resin particles are the same as those described above in "(A) Suspension polymerization method".

The content of the colorant contained in the colored resin particles is appropriately adjusted according to the type of the colorant so that the desired color development is obtained and the toner has the specific viscoelastic characteristics, and it is not particularly limited. The content of the colorant is preferable 1 part by mass or more and 20 parts by mass or less, and more preferably 5 parts by mass or more and 15 parts by mass or less, with respect to 100 parts by mass of the binder resin, since the toner is likely to satisfy the specific viscoelastic characteristics.

The content of the softening agent contained in the colored resin particles is preferably 1 part by mass or more and 30 parts by mass or less, and more preferably 5 parts by mass or more and 20 parts by mass or less, with respect to 100 parts by mass of the binder resin, from the viewpoint of adjusting the viscoelasticity of the toner and improving the balance between the shelf stability and low-temperature fixability of the toner.

The content of the charge control agent contained in the colored resin particles is preferably 0.01 parts by mass or more and 15 parts by mass or less, and more preferably 0.03 parts by mass or more and 8 parts by mass or less, with respect to 100 parts by mass of the binder resin. When the content of the charge control agent is equal to or more than the lower limit value, the occurrence of fog can be suppressed. When the content is equal to or less than the upper limit value, printing stains can be suppressed. As described above, the viscoelasticity of the toner can be adjusted by adjusting the content of the charge control agent.

The toner of the present disclosure is preferably a yellow toner in which the colored resin particles contain a disazo pigment and a yellow dye in combination as the yellow colorant and a pentaerythritol ester compound as the softening agent. The toner of the present disclosure is more preferably a yellow toner in which the colored resin particles contain C.I. Pigment Yellow 214 and C.I. Solvent Yellow 98 in combination as the yellow colorant and a pentaerythritol tetrabehenate as the softening agent. This is because the toner is likely to satisfy the specific viscoelastic characteristics; the shelf stability is improved; and especially, a reduction in the glossiness of the image is suppressed so that a high-quality image can be formed.

The volume average particle diameter (Dv) of the colored resin particles is preferably 3 μm or more and 15 μm or less, and more preferably 4 μm or more and 12 μm or less. When the Dv is equal to or more than the lower limit value, a decrease in the flowability of the polymerized toner is suppressed, and it is easy to improve transferability and suppress a decrease in image density. When the Dv is equal to or less than the upper limit value, a decrease in image resolution can be suppressed.

As for the colored resin particles, the ratio (Dv/Dn) of the volume average particle diameter (Dv) to the number average particle diameter (Dn) is preferably 1.0 or more and 1.3 or less, and more preferably 1.0 or more and 1.2 or less. When the "Dv/Dn" ratio is within the range, a decrease in transferability, image density and resolution can be suppressed.

The volume average particle diameter (Dv) and number average particle diameter (Dn) of the colored resin particles can be measured by means of a particle diameter distribution measuring device (product name: MULTISIZER; manufactured by Beckman Coulter, Inc.), for example.

The average circularity of the colored resin particles of the present disclosure is preferably 0.960 or more, more preferably 0.970 or more, and even more preferably 0.980 or more, from the viewpoint of image reproducibility. The average circularity of the colored resin particles of the present disclosure is 1 or less. When the measurement sample of the colored resin particles is perfectly spherical, the average circularity is 1.

In the present disclosure, "circularity" is defined as a value obtained by dividing the perimeter of a circle having the same area as the projected area of a particle image by the perimeter of the projected image of the particle. The "average circularity" is an indicator that shows the degree of the surface roughness of the colored resin particles, and it can be used as a simple method for quantitatively representing the shape of the particles. The average circularity gets smaller as the surface shape of the measurement sample becomes more complex.

For example, the circularity of the colored resin particles can be determined as follows. An aqueous solution in which the colored resin particles are dispersed, is used as a sample solution, and the projected image of the colored resin particles in the sample solution is taken by means of a flow type particle image analyzer (e.g., product name: FPIA-2100, manufactured by: Sysmex Corporation). The perimeter of a circle having the same area as the projected area of the particle image, and the perimeter of the projected particle image are measured from the projected image, and the circularity of the colored resin particles is obtained by the following calculation formula 1: (Circularity)=(Perimeter of the circle having the same area as the projected area of the particle image)/(Perimeter of the projected particle image). The average circularity is the average value of the circularities of the colored resin particles contained in the sample solution.

4. External Additive

The toner of the present disclosure further contains an external additive which is added on the surface of the colored resin particles. Since the toner of the present disclosure contains the external additive, the toner is likely to satisfy the specific viscoelastic characteristics described above, and the viscoelasticity of the toner can be adjusted by the type and content of the external additive. Further, since the toner of the present disclosure contains the external additive, the chargeability, fluidity and shelf stability of the toner can be improved.

By mixing the colored resin particles with the external additive, the external additive can be added on the surface of the colored resin particles. A mixer is used for mixing them and adding the external additive on the particle surface, and the mixer is not particularly limited, as long as it is a mixing machine capable of adding the external additive on the surface of the colored resin particles. For example, FM MIXER (: product name, manufactured by NIPPON COKE & ENGINEERING CO., LTD.), SUPER MIXER (: product name, manufactured by KAWATA Manufacturing Co., Ltd.), Q MIXER (: product name, manufactured by NIPPON COKE & ENGINEERING CO., LTD.), MECHANOFUSION SYSTEM (: product name, manufactured by Hosokawa Micron Corporation) and MECHANOMILL (: product name, manufactured by Okada Seiko Co., Ltd.) can be used.

As the external additive, examples include, but are not limited to, inorganic fine particles such as fine particles of silica, titanium oxide, aluminum oxide, zinc oxide, tin oxide, calcium carbonate, calcium phosphate and cerium oxide, and organic fine particles such as fine particles of polymethyl methacrylate resin, silicone resin and melamine resin. Among them, the inorganic fine particles are preferable. Among the inorganic fine particles, fine particles of at least one selected from silica and titanium oxide are preferable, and fine particles of silica are particularly preferable.

These external additives may be used solely. It is preferable to use them in combination of two or more kinds.

The content of the external additive is appropriately adjusted so that the toner has the specified viscoelastic characteristics. The content of the external additive is not particularly limited, and it is preferably 0.05 parts by mass or more and 6 parts by mass or less, and more preferably 0.2 parts by mass or more and 5 parts by mass or less, with respect to 100 parts by mass of the colored resin particles, since the toner is likely to satisfy the specified viscoelastic characteristics. When the content of the external additive is equal to or more than the lower limit value, the generation of a transfer residue can be suppressed. When the content of the external additive is equal to or less than the upper limit value, the occurrence of fog can be suppressed. Further, by adjusting the content of the external additive, the viscoelasticity of the toner can be adjusted. As the content of the external additive increases, the temperature (Ta) at which tan $\delta$=1.5 of the toner is likely to increase.

5. Performance of Toner

The toner of the present disclosure is a toner which has good shelf stability and in which a decrease in the blocking occurrence temperature (heat-resistant temperature) is suppressed. The blocking occurrence temperature (heat-resistant temperature) of the toner of the present disclosure is preferably 57° C. or more, more preferably 58° C. or more, and even more preferably 59° C. or more. In the present disclosure, the blocking occurrence temperature of the toner is defined as the maximum temperature at which, when the toner is stored at a constant temperature for 8 hours, the mass of the toner to be aggregated is 5% by mass or less of the total amount of the toner. The blocking occurrence temperature of the toner can be measured by the same method as the measurement of the heat-resistant temperature of the toner, which is described below in "Examples".

The toner of the present disclosure is a toner which has good low-temperature fixability and in which an increase in the fixing temperature is suppressed. The fixing temperature of the toner of the present disclosure is preferably less than 170° C., more preferably 165° C. or less, and even more preferably 160° C. or less. In the present disclosure, the fixing temperature of the toner is defined as the minimum temperature at which, when a solid image is printed on a sheet using a printer and a rubbing test is carried out on the solid area, a fixing rate of 80% or more is obtained from the following formula as the ratio of the image density after the rubbing test φ (after)) to the image density before the rubbing test φ (before)):

$$\text{Fixing rate (\%)}=[ID(\text{after})/ID(\text{before})]\times 100$$

The rubbing test is carried out by attaching the measurement area to a fastness tester with an adhesive tape, applying a 500 g load, and carrying out reciprocating rubbing 5 times with a rubbing terminal wrapped with a cotton cloth.

In the present disclosure, the solid area is an area in which the developer is controlled to adhere to all dots within the area, which are virtual dots for controlling the printer control unit.

The toner of the present disclosure is a toner which has good hot offset resistance and in which a decrease in hot offset appearance temperature is suppressed. The hot offset appearance temperature of the toner of the present disclosure is preferably 200° C. or more, more preferably 220° C. or more, even more preferably 225° C. or more, and still more preferably more than 225° C. In the present disclosure, the hot offset appearance temperature of the toner is defined as the minimum temperature of the fixing roller at which fusion of the toner occurs on the fixing roller when a solid image is printed on a paper using the printer.

The toner of the present disclosure may be used as a one-component toner composed of the toner only, or it may be mixed and stirred with carrier particles and used as a two-component toner.

EXAMPLES

Hereinafter, the present disclosure will be described further in detail, with reference to examples and comparative examples. However, the present disclosure is not limited to these examples. Herein, part(s) and % are on a mass basis unless otherwise noted.

The weight average molecular weight Mw of the polymer was determined as a polystyrene equivalent molecular weight measured by GPC. A sample for measurement was obtained as follows: a polymer was dissolved in tetrahydrofuran (THF) so as to have a concentration of 2 mg/mL, and an ultrasonic treatment was carried out thereon for 10 minutes, followed by filtration through a 0.45 μm membrane filter, thereby obtaining the sample for measurement. The measurement conditions were as follows: temperature: 40° C., solvent: tetrahydrofuran, flow rate: 1.0 mL/min, concentration: 0.2 wt %, and sample input: 100 μL. As a column, GPC TSKgel Multipore HXL-M (30 cm×2) manufactured by Tosoh Corporation, was used. Also, the measurement was carried out under the condition that the first-order correlation (Log (Mw)–elution time) in a weight average molecular weight (Mw) range of from 1,000 to 300,000, was 0.98 or more. The weight average molecular weight Mw of the binder resin in the colorant resin particles was obtained as follows: a sample was obtained by dissolving the colored resin particles in THF, and the weight average molecular weight Mw was determined using data obtained by subtracting the peaks of the charge control resin and ester wax measured in advance from the results of GPC obtained by the aforementioned measurement method.

Example 1

(1) Preparation of Polymerizable Monomer Composition for Core

First, 73 parts of styrene, 27 parts of n-butyl acrylate, 0.1 parts of a polymethacrylic acid ester macromonomer (product name: AA6; manufactured by: TOAGOSEI Co., Ltd.; Tg: 94° C.), 0.1 parts of divinylbenzene, 0.75 parts of tetraethylthiuram disulfide, and as a yellow colorant, 10.0 parts of C.I. Pigment Yellow 214 and 2.0 parts of C.I. Solvent Yellow 98 were wet-pulverized by means of a media-type disperser (product name: PICOMILL, manufactured by ASADA IRON WORKS. Co., Ltd.) To the mixture obtained by the wet pulverization, 2.0 parts of a charge control resin 1 (CCR1) (a quaternary ammonium salt group-containing styrene-acrylic copolymer, Tg: 76° C.) and 15 parts of a polyfunctional ester wax (pentaerythritoltetrastearate, melting point: 76° C., molecular weight: 1428) were added, mixed and dissolved to prepare a polymerizable monomer composition.

(2) Preparation of Aqueous Dispersion Medium

An aqueous solution in which 7.3 parts of sodium hydroxide was dissolved in 50 parts of ion exchanged water, was gradually added under stirring to an aqueous solution in which 10.4 parts of magnesium chloride was dissolved in 280 parts of ion exchanged water, whereby a magnesium hydroxide colloidal dispersion was prepared.

(3) Preparation of Aqueous Dispersion of Polymerizable Monomer for Shell

An aqueous dispersion of a polymerizable monomer for shell was prepared by finely dispersing 2 parts of methyl methacrylate and 130 parts of water by means of an ultrasonic emulsifier.

(4) Droplets Forming Step

The polymerizable monomer composition was added to the magnesium hydroxide colloidal dispersion (the magnesium hydroxide colloid amount: 5.3 parts), and the mixture was further stirred. Then, as a polymerization initiator, 6 parts of t-butylperoxy-2-ethyl hexanoate was added thereto. The dispersion mixed with the polymerization initiator was dispersed at a rotational frequency of 15,000 rpm by an in-line type emulsifying and dispersing machine (manufactured by Pacific Machinery & Engineering Co., Ltd, product name: MILDER) to form the polymerizable monomer composition into droplets.

(5) Suspension Polymerization Step

The dispersion containing the polymerizable monomer composition droplets, was placed in a reactor, and the temperature of the container was raised to 90° C. to initiate a polymerization reaction. After a polymerization conversion rate of almost 100% was reached, a solution prepared by dissolving, as a polymerization initiator for shell, 0.1 parts of 2,2'-azobis[2-methyl-N-(2-hydroxyethyl)-propionamide] (product name: VA-086, manufactured by Wako Pure Chemical Industries, Ltd., a water-soluble initiator) in the aqueous dispersion of the polymerizable monomer for shell, was added to the reactor. Next, the polymerization reaction was further continued by maintaining the container temperature at 95° C. for 4 hours. Then, the polymerization reaction was stopped by water cooling, thereby obtaining an aqueous dispersion of core-shell type colored resin particles.

(6) Post-Treatment Step

The aqueous dispersion of the colored resin particles was subjected to acid washing (25° C., 10 minutes) by adding, while stirring the aqueous dispersion, sulfuric acid to the dispersion until the pH of the dispersion reached 4.5 or less. Then, the colored resin particles were separated by filtration and washed with water. The washing water was filtered. The electric conductivity of the filtrate at this time was 20 μS/cm. Furthermore, the colored resin particles subjected to the washing and filtering steps were dehydrated and dried to obtain dried colored resin particles (1).

(7) Volume Average Particle Diameter (Dv), Number Average Particle Diameter (Dn) and Particle Size Distribution (Dv/Dn)

About 0.1 g of the colored resin particles (1) were weighed out and put in a beaker. Next, as a dispersant, 0.1 mL of a surfactant aqueous solution (product name: DRIWEL, manufactured by: Fujifilm Corporation) was added thereto. In addition, 10 mL to 30 mL of ISOTON II was put in the beaker. The mixture was dispersed for 3 minutes with a 20 W (watt) ultrasonic disperser. Then, the volume average particle diameter (Dv) and number average particle diameter (Dn) of the colored resin particles were measured with a particle size analyzer (product name: MULTISIZER, manufactured by: Beckman Coulter, Inc.) in the following condition: aperture diameter: 100 μm, medium: ISOTON II, and the number of measured particles: 100,000 particles. Then, the particle size distribution (Dv/Dn) of the colored resin particles was calculated. The results of the measurement and calculation are shown in Table 1 below.

(8) Average Circularity

First, 10 mL of ion-exchanged water was poured into a container. As a dispersant, 0.02 g of a surfactant aqueous solution (product name: DRIWEL, manufactured by: Fujifilm Corporation) was added thereto. In addition, 0.02 g of the colored resin particles (1) were further added thereto. The mixture was subjected to a dispersion treatment for 3 minutes at 60 W (Watt) with an ultrasonic disperser. The amount of ion-exchanged water was adjusted so that the concentration of the colored resin particles at the time of measurement was from 3000 particles/μL to 10,000 particles/μL, thereby obtaining a sample solution. A projected image was taken by means of a flow type particle image analyzer (product name: FPIA-2100, manufactured by: Sysmex Corporation) for 1000 to 10,000 colored resin particles having a circle equivalent diameter of 0.4 μm or more. From the projected image of the particles, the perimeter of a circle having the same area as the projected area of the particle image, and the perimeter of the projected particle image were measured, and the circularity of the colored resin particles was obtained by the following calculation formula 1: (Circularity)=(Perimeter of the circle having the same area as the projected area of the particle image)/(Perimeter of the projected particle image). The average circularity was calculated as the average value of circularities of the colored resin particles contained in the sample solution.

2. Production of Toner

To 100 parts of the colored resin particles (1), 0.20 parts of hydrophobized silica fine particles (1) having an average particle diameter of 7 nm, 0.76 parts of hydrophobized silica fine particles (2) having an average particle diameter of 20 nm, and 1.91 parts of hydrophobized silica fine particles (3) having an average particle diameter of 50 nm, were added. They were mixed by means of a high-speed mixing machine (manufactured by NIPPON COKE & ENGINEERING CO., LTD., product name: FM MIXER) to add the external additives on the surface of the colored resin particles (1), thereby obtaining the toner of Example 1.

Examples 2 to 7 and Comparative Examples 1 to 4

1. Production of Colored Resin Particles (2) to (7) and Comparative Colored Resin Particles (1) to (4)

The colored resin particles (2) to (7) and the comparative colored resin particles (1) to (4) were obtained in the same manner as in "1. Production of Colored Resin Particles (1)" of Example 1, except that the composition of the polymerizable monomer composition for core was changed as shown below in Table 1 to prepare the composition.

For the colored resin particles (2) to (7) and the comparative colored resin particles (1) to (4), the volume average particle diameter (Dv), the number average particle diameter (Dn), the particle diameter distribution (Dv/Dn) and the average circularity were measured in the same manner as the colored resin particles (1) obtained in Example 1. The results are shown in Table 1.

TABLE 1

| | | ST | BA | AA6 | Divinyl-benzene | Tetra-ethyl thiuram disulfide | Colorant 1 | | Colorant 2 | | |
|---|---|---|---|---|---|---|---|---|---|---|---|
| | | Amount [parts] | Amount [parts] | Amount [parts] | Amount [parts] | Amount [parts] | Type | Amount [parts] | Type | Amount [parts] | CCR Type |
| Example 1 | Colored resin particles (1) | 73 | 27 | 0.1 | 0.1 | 0.75 | PY214 | 10.0 | SY98 | 2.0 | CCR1 |
| Example 2 | Colored resin particles (2) | 73 | 27 | 0.1 | 0.3 | 0.75 | PY214 | 10.0 | SY98 | 2.0 | CCR2 |
| Example 3 | Colored resin particles (3) | 73 | 27 | 0.1 | 0.1 | 0.75 | PY214 | 10.0 | SY98 | 2.0 | CCR2 |
| Example 4 | Colored resin particles (4) | 71 | 29 | 0.1 | 0.1 | 0.75 | PY214 | 10.0 | SY98 | 2.0 | CCR2 |
| Example 5 | Colored resin particles (5) | 73 | 27 | 0.1 | 0.1 | 0.75 | PY214 | 10.0 | SY98 | 2.0 | CCR3 |

TABLE 1-continued

| | | | | | | | | | | | |
|---|---|---|---|---|---|---|---|---|---|---|---|
| Example 6 | Colored resin particles (6) | 73 | 27 | 0.1 | 0 | 0.75 | PY214 | 10.0 | SY98 | 2.0 | CCR4 |
| Example 7 | Colored resin particles (7) | 72 | 28 | 0.1 | 0 | 0.5 | PY122 | 8.5 | — | — | CCR3 |
| Comparative Example 1 | Comparative colored resin particles (1) | 73 | 27 | 0.1 | 0.3 | 0.75 | PY214 | 10.0 | SY98 | 2.0 | CCR1 |
| Comparative Example 2 | Comparative colored resin particles (2) | 73 | 27 | 0.1 | 0.3 | 0.75 | PY214 | 10.0 | SY98 | 2.0 | CCR2 |
| Comparative Example 3 | Comparative colored resin particles (3) | 74 | 26 | 0.1 | 0 | 2 | PB15:3 | 6.0 | — | — | CCR2 |
| Comparative Example 4 | Comparative colored resin particles (4) | 74 | 26 | 0.1 | 0.35 | 1 | Carbon Black | 10.0 | — | — | CCR3 |

| | CCR | | | | Pentae- | | | | |
|---|---|---|---|---|---|---|---|---|---|
| | Tg [° C.] | Functional group amount [% by mass] | Mw | Amount [parts] | rythritol tetrabeh enate Amount [parts] | Dv [μm] | Dn [μm] | Dv/Dn | Average circularity |
| Example 1 | 76 | 2 | 12100 | 2.0 | 15 | 6.6 | 5.7 | 1.16 | 0.987 |
| Example 2 | 95 | 2 | 12100 | 1.7 | 15 | 6.5 | 5.9 | 1.10 | 0.987 |
| Example 3 | 95 | 2 | 12100 | 1.7 | 15 | 6.5 | 5.6 | 1.16 | 0.987 |
| Example 4 | 95 | 2 | 12100 | 1.7 | 15 | 6.5 | 5.8 | 1.12 | 0.987 |
| Example 5 | 85 | 1 | 20000 | 6.0 | 15 | 6.0 | 5.0 | 1.20 | 0.987 |
| Example 6 | 85 | 0.5 | 20000 | 8.0 | 15 | 6.5 | 5.8 | 1.12 | 0.987 |
| Example 7 | 85 | 1 | 20000 | 10.0 | 12 | 5.0 | 4.4 | 1.14 | 0.986 |
| Comparative Example 1 | 76 | 2 | 12100 | 1.0 | 15 | 6.6 | 5.7 | 1.16 | 0.987 |
| Comparative Example 2 | 95 | 2 | 12100 | 1.3 | 15 | 6.5 | 5.7 | 1.14 | 0.987 |
| Comparative Example 3 | 95 | 2 | 12100 | 3.0 | 9 | 7.0 | 5.8 | 1.21 | 0.979 |
| Comparative Example 4 | 85 | 1 | 20000 | 10.0 | 20 | 6.16 | 5.29 | 1.16 | 0.990 |

Abbreviations in the table are as follows.

ST: Styrene

BA: n-Butyl acrylate

AA6 Polymethacrylic acid ester macromonomer (product name: AA6; manufactured by: TOAGOSEI Co., Ltd.; Tg: 94° C.)

PY214: C.I. Pigment Yellow 214

SY98: C.I. Solvent Yellow 98

PB15:3: C.I. Pigment Blue 15:3

PR122: C.I. Pigment Red 122

CCR1: Charge control resin 1, a quaternary ammonium salt group-containing styrene-acrylic copolymer, Tg: 76° C., functional group amount: 2% by mass, Mw: 12100

CCR2: Charge control resin 2, a quaternary ammonium salt group-containing styrene-acrylic copolymer, Tg: 95° C., functional group amount: 2% by mass, Mw: 12100

CCR3: Charge control resin 3, a quaternary ammonium salt group-containing styrene-acrylic copolymer, Tg: 85° C., functional group amount: 1% by mass, Mw: 20000

CCR4: Charge control resin 4, a quaternary ammonium salt group-containing styrene-acrylic copolymer, Tg: 85° C., functional group amount: 0.5% by mass, Mw: 20000

The functional group amount under "CCR" (charge control resin) is the amount (% by mass) of the functional group-containing constitutional unit in 100% by mass of all constitutional units constituting the charge control resin.

2. Production of Toner

The toners of Examples 2 to 7 and Comparative Examples 1 to 4 were obtained in the same manner as in "2. Production of Toner" of Example 1, except that the colored resin particles (1) were changed to the colored resin particles (2) to (7) and the comparative colored resin particles (1) to (4), respectively, and the amount of the external additives added on the particle surface was changed as shown in Table 2.

TABLE 2

| | Silica fine particles (1) Amount [parts] | Silica fine particles (2) Amount [parts] | Silica fine particles (3) Amount [parts] |
|---|---|---|---|
| Example 1 | 0.20 | 0.76 | 1.91 |
| Example 2 | 0.20 | 0.76 | 1.91 |
| Example 3 | 0.20 | 0.76 | 1.91 |
| Example 4 | 0.20 | 0.76 | 1.91 |
| Example 5 | 0.20 | 0.76 | 1.91 |
| Example 6 | 0.20 | 0.76 | 1.91 |
| Example 7 | 0.20 | 0.98 | 1.23 |
| Comparative Example 1 | 0.20 | 0.60 | 1.50 |

TABLE 2-continued

| | Silica fine particles (1) Amount [parts] | Silica fine particles (2) Amount [parts] | Silica fine particles (3) Amount [parts] |
|---|---|---|---|
| Comparative Example 2 | 0.20 | 0.76 | 1.91 |
| Comparative Example 3 | 0.20 | 0.74 | 1.84 |
| Comparative Example 4 | 0.20 | 0.67 | 1.12 |

[Measurement of Viscoelasticity]

For the obtained toners of Examples 1 to 7 and Comparative Examples 1 to 4, the temperature dependence curve of the loss tangent (tan δ) was obtained by dynamic viscoelasticity measurement. The dynamic viscoelasticity measurement was carried out using a rotating flat plate rheometer (manufactured by: TA Instruments Inc., product name: ARES-G2) and a cross hatch plate under the conditions mentioned below. A test piece was obtained by pouring 0.2 g of the toner into a cylindrical mold of 8 mm φ and pressurizing the toner at 1.0 MPa for 30 seconds, thereby forming a columnar molded product having a diameter of 8 mm φ and a thickness of 2 mm to 4 mm.

(Conditions of the Dynamic Viscoelasticity Measurement)

Frequency: 1 Hz

Sample set: Test piece (2 mm to 4 mm thick) was sandwiched between 8 mm φ plates with a 20 g load Temperature at sample setting: 40° C.

Heating rate: 5° C./min

Temperature range: 40° C. to 150° C.

The shape of the temperature dependence curve of the loss tangent (tan δ) of the toners obtained in Examples 1 to 7 had the following characteristics. The curve had at least one peak in a range of 50° C. or more and less than 90° C. After the temperature exceeded the temperature at which the tan δ became the maximum value of the peak closest to 90° C., the tan δ decreased with increasing temperature, and then the tan δ reached a minimum point of less than 1.00. After the temperature exceeded the temperature at the minimum point, the tan δ increased with increasing temperature, and then the tan δ reached 1.50. In a temperature region higher than the temperature (Ta) with a loss tangent of 1.50, the curve had a peak of which the maximum value of the tan δ was more than 1.50, or the tan δ was substantially constant within a range of more than 1.5 and 1.8 or less, or the tan δ continued to rise. As an example, the temperature dependence curve of the loss tangent (tan δ) of the toner obtained in Example 1 is shown in FIG. 1. The dynamic viscoelasticity measurement was carried out in a range of from 40° C. to 150° C. However, FIG. 1 shows the measurement results in a range of from 50° C. to 150° C.

Further, for each toner, the glass transition temperature (Tg), the loss tangent (tan δ) at the glass transition temperature (Tg), the lowest temperature (Ta) at which the loss tangent (tan δ) became 1.50 within a temperature range of 90° C. or more and 160° C. or less, and the storage elastic modulus (G') at the temperature (Ta) were obtained. The results are shown in Table 3.

[Measurement of Softening Temperature $T_{1/2}$]

For the toners obtained in Examples 1 to 7 and Comparative Examples 1 to 4, the softening temperature ($T_{1/2}$) was measured by the ½ method at a pressure of 5.0 kgf/cm$^2$ using a flow tester (product name: CFT-500C, manufactured by: Shimadzu Corporation) under the following measurement conditions.

(Measurement Conditions)

Starting temperature: 35° C.

Heating rate: 3° C./min

Preheating time: 5 min

Cylinder pressure: 5.0 kgf/cm$^2$

Die hole diameter: 0.5 mm

Die length: 1.0 mm

Sample input amount: 1.0 g to 1.3 g

[Evaluation]

(1) Heat-Resistant Temperature of Toner

First, 10 g of the toner was placed in a 100 mL polyethylene container, and the container was hermetically sealed. Then, the container was set in a constant temperature water bath set at a predetermined temperature. After 8 hours passed, the container was removed from the constant temperature water bath. The toner was transferred from the removed container onto a 42-mesh sieve in a manner preventing vibration as much as possible, and then it was set in a powder characteristic tester (manufactured by Hosokawa Micron Corporation, product name: POWDER TESTER PT-R (trademark)). The amplitude condition of the sieve was set to 1.0 mm, and the sieve was vibrated for 30 seconds. Then, the mass of the toner remaining on the sieve was measured, and the thus-measured mass was determined as an aggregated toner mass.

The maximum temperature at which the aggregated toner mass became 0.5 g or less, was determined as the heat-resistant temperature of the toner. The results are shown in Table 3. As the heat-resistant temperature increases, the blocking is less likely to occur during toner storage and the toner is more excellent in shelf stability.

(2) Fixing Temperature of Toner

A commercially-available, non-magnetic one-component developing printer (a 24 sheets per minute printer; printing speed: 24 sheets/min) was modified so that the temperature of the fixing roller was able to be changed. The temperature of the fixing roller of the printer was changed by 5° C., and the fixing rate at each changed temperature was measured. The relationship between the temperature and the fixing rate was determined, and the lowest temperature at which a fixing rate of 80% or more was obtained, was defined as the fixing temperature of the toner. The results are shown in Table 3. The lower the fixing temperature, the better the toner has low-temperature fixability.

The fixing rate was calculated from the image density ratio before and after a rubbing test operation of a black solid area on a test paper sheet printed by the printer. When the image density before the rubbing test is determined as "ID (before)" and the image density after the rubbing test is determined as "ID (after)", the fixing rate is determined as follows: the fixing rate (%)=[ID (after)/ID (before)]×100. The rubbing test was carried out by attaching the measurement area of the test paper sheet to a fastness tester with an adhesive tape, applying a 500 g load, and carrying out reciprocating rubbing 5 times with a rubbing terminal wrapped with a cotton cloth.

(3) Gloss (Glossiness)

A commercially-available, non-magnetic one-component developing printer (a 24 sheets per minute printer; printing speed: 24 sheets/min) was modified so that the temperature of the fixing roller was able to be changed. The toner cartridge in the development device of the modified printer was filled with 100 g of the toner. Then, printing sheets were loaded in the printer.

The printer was adjusted so that the amount of the toner of a solid image on the sheets became 0.30 (mg/cm$^2$). Then, the temperature of the fixing roller (fixing temperature) was set at 170° C., and a solid image of 5 cm square was printed on a sheet (manufactured by: Xerox Co., Ltd., product name:

VITALITY). The obtained solid image of 5 cm square was measured for gloss value with a gloss meter (product name: VGS-SENSOR, manufactured by: Nippon Denshoku Industries Co., Ltd.) at an incident angle of 60°. The results are shown in Table 3. The larger the gloss value, the higher the gloss feeling.

(4) Hot Offset Appearance Temperature (H.O. Temperature)

A commercially-available, non-magnetic one-component developing printer (a 24 sheets per minute printer; printing speed: 24 sheets/min) was modified so that the temperature of the fixing roller was able to be changed. Using the modified printer, a hot offset test was carried out as follows. The temperature of the fixing roller was changed from 150° C. to 230° C. by 5° C., and a solid image of 5 cm square was printed on a sheet (manufactured by: Xerox Co., Ltd., and product name: VITALITY). Then, the existence of the hot offset phenomenon (that is, whether or not the fusion of the toner appeared on the fixing roller) was visually observed.

The lowest temperature at which the fusion of the toner appeared on the fixing roller in the hot offset test, was defined as the hot offset appearance temperature (H.O. temperature). The higher the hot offset appearance temperature (H.O. temperature), the better the hot offset resistance of the toner.

ture was high; the hot offset resistance was good; and the decrease in gloss (glossiness) was suppressed.

For the toners of Comparative Examples 1 and 2, since the temperature (Ta) was 145° C. or more, the fixing temperature was high, and the low-temperature fixability was poor.

For the toner of Comparative Example 3, since the loss tangent (tan δ) at the glass transition temperature (Tg) was more than 1.70, the heat-resistant temperature was low, and the shelf stability was poor. Also for the toner of Comparative Example 3, since the temperature (Ta) was 95° C. or less, the fluidity was high, and reduction in the gloss of the image was suppressed. However, the hot offset appearance temperature was low, and the hot offset resistance was poor.

For the toner of Comparative Example 4, since the loss tangent (tan δ) at the glass transition temperature (Tg) was more than 1.70, the heat-resistant temperature was low; the shelf stability was poor; and the gloss of the image was reduced.

The invention claimed is:

1. A toner comprising colored resin particles containing a binder resin, a colorant, a softening agent and a charge control agent, and an external additive,

TABLE 3

| | CCR | | | | Toner | | | | | Evaluation | | | |
|---|---|---|---|---|---|---|---|---|---|---|---|---|---|
| | Tg [° C.] | Functional group amount [% by mass] | Amount [parts] | Binder resin Mw | Tg [° C.] | tanδ (Tg) | Ta [° C.] (tanδ = 1.5) | G' [Pa] (tanδ = 1.5) | $T_{1/2}$ [° C.] | Heat-resistant temperature [° C.] | Fixing temperature [° C.] | Gloss (glossiness) | H.O. temperature [° C.] |
| Example 1 | 76 | 2 | 2.0 | 45300 | 61 | 1.40 | 137 | 5872 | 131 | 58 | 150 | 8.0 | 230 |
| Example 2 | 95 | 2 | 1.7 | 61700 | 60 | 1.20 | 137 | 6254 | 133 | 60 | 150 | 7.5 | 230 |
| Example 3 | 95 | 2 | 1.7 | 44900 | 62 | 1.16 | 140 | 4908 | 130 | 60 | 155 | 8.0 | 230 |
| Example 4 | 95 | 2 | 1.7 | 47200 | 58 | 1.30 | 136 | 5932 | 128 | 59 | 155 | 8.0 | 230 |
| Example 5 | 85 | 1 | 6.0 | 45500 | 65 | 1.40 | 132 | 7446 | 131 | 58 | 145 | 8.0 | 230 |
| Example 6 | 85 | 0.5 | 8.0 | 38200 | 61 | 1.57 | 135 | 6173 | 131 | 60 | 160 | 8.0 | 230 |
| Example 7 | 85 | 1 | 10.0 | 34100 | 66 | 1.57 | 110 | 32464 | 131 | 57 | 150 | 7.0 | 230 |
| Comparative Example 1 | 76 | 2 | 1.0 | 111900 | 61 | 1.15 | 150 | 4673 | 141 | 58 | 170 | 7.5 | 230 |
| Comparative Example 2 | 95 | 2 | 1.3 | 67300 | 62 | 1.15 | 145 | 4998 | 135 | 62 | 170 | 7.5 | 230 |
| Comparative Example 3 | 95 | 2 | 3.0 | 45000 | 63 | 1.76 | 95 | 64665 | 126 | 56 | 140 | 8.0 | 190 |
| Comparative Example 4 | 85 | 1 | 10.0 | 50300 | 66 | 1.86 | 101 | 43249 | 132 | 56 | 150 | 5.7 | 225 |

According to the results shown in Table 3, for the toners of Examples 1 to 7, which are the toners of the present disclosure, the glass transition temperature (Tg) specified from the temperature dependence curve of the loss tangent (tan δ) obtained by dynamic viscoelastic measurement, was 50° C. or more and less than 90° C.; the loss tangent (tan δ) at the glass transition temperature (Tg) was 1.70 or less; in a temperature range of 90° C. or more and 160° C. or less, a lowest temperature (Ta) with a loss tangent of 1.50 was more than 95° C. and less than 145° C.; and the storage elastic modulus (G') at the lowest temperature (Ta) was less than 56000 Pa. Accordingly, for the toners of Examples 1 to 7, the fixing temperature was not too high and the low temperature fixability was good; the heat-resistant temperature (blocking occurrence temperature) was high; and the shelf stability was good; the hot offset appearance temperawherein the binder resin contains a polymer of polymerizable monomers containing at least a monovinyl monomer, a weight average molecular weight of the polymer is 30000 or more and 80000 or less, wherein the softening agent is an ester wax, and a content of the softening agent is 12 parts by mass or more and 15 parts by mass or less, with respect to 100 parts by mass of the monovinyl monomer, wherein a content of the charge control agent is 1.7 parts by mass or more and 15 parts by mass or less, with respect to 100 parts by mass of the monovinyl monomer, and wherein a glass transition temperature (Tg) specified from a temperature dependence curve of a loss tangent (tan δ) obtained by dynamic viscoelastic measurement of the toner, is 50° C. or more and less than 90° C.; the loss tangent (tan δ) at the glass transition temperature (Tg) is 1.70 or less; in a temperature range of 90° C. or more and 160° C. or less, a lowest temperature (Ta) with a loss tangent of 1.50 is more than 95° C. and less than 145° C.; and a storage elastic modulus (G') at the lowest temperature (Ta) is 38000 Pa or less.

2. The toner according to claim 1, wherein a softening temperature ($T_{1/2}$) measured by a ½ method at a pressure of 5.0 $kgf/cm^2$ using a flow tester, is more than 110° C. and less than 150° C.

3. The toner according to claim 1, wherein the charge control agent contains a functional group-containing copolymer, and an amount of a functional group-containing constitutional unit contained in the functional group-containing copolymer, is 3% by mass or less.

4. The toner according to claim 1, wherein the binder resin is a polymer of one or two or more kinds of polymerizable monomers containing at least one kind of monovinyl monomer selected from the group consisting of styrene, acrylic ester and methacrylic ester.

* * * * *